A. B. CARTY.
INK FOUNTAIN.
APPLICATION FILED MAY 1, 1915.
Reissued July 18, 1916. 14,165.
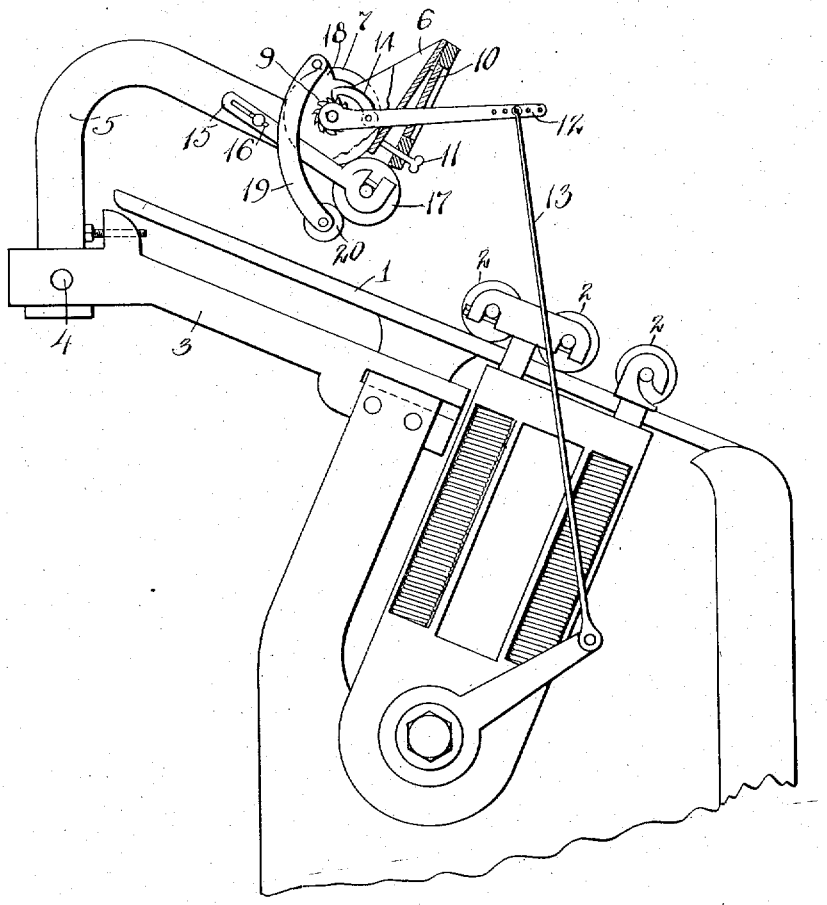
WITNESSES=
O. M. Kappler
Thos. H. Fay
INVENTOR
Alton B. Carty
By Fay, Oberlin & Fay
ATTORNEYS-
THE NORRIS PETERS CO., PHOTO-LITHO., WASHINGTON, D. C.

UNITED STATES PATENT OFFICE.

ALTON B. CARTY, OF WASHINGTON, DISTRICT OF COLUMBIA.

INK-FOUNTAIN.

14,165. Specification of Reissued Letters Patent. Reissued July 18, 1916.

Original No. 1,076,482, dated October 21, 1913, Serial No. 774,956. Application for reissue filed May 1, 1915. Serial No. 25,299.

*To all whom it may concern:*

Be it known that I, ALTON B. CARTY, a citizen of the United States, residing at Washington, in the District of Columbia, have invented new and useful Improvements in Ink-Fountains, of which the following is a specification.

My present invention pertains to ink fountains for printing presses; and it contemplates the provision of a fountain or inking apparatus, designed particularly for use on platen presses having ink plates and form rollers, and constructed in a simple manner with a view to providing an even film of ink, without streaks on the form rollers, and this without the employment of operating means other than the form rollers and the mechanism by which the fountain roller is rotated step by step about its axis, and while the machine is being operated at its highest rate of speed.

The invention also contemplates the provision of an inking apparatus in which a composition roller, of the same size and material as the rollers ordinarily used on a press, is employed in contact with the metallic roller of the fountain and is utilized to transfer ink to a metallic roller that normally contacts with said composition roller and is carried by a swinging support so as to receive the contact of and be moved backwardly and rotated by the uppermost of the form rollers and apply ink thereto; the metallic roller of the inking apparatus in contact with the composition roller thereof and adapted to be engaged and moved by the uppermost of the composition form rollers, being highly advantageous inasmuch as it obviates undue suction and overheating and hence conduces to the distribution of ink to the best advantage on the said metallic roller.

A fountain or inking apparatus characterized as stated is adapted to be expeditiously and easily installed on a press of the type that is at present in general use; and it will be fully understood in all of its details from the following description and claims when the same are read in connection with the drawing, accompanying and forming part of this specification; in which the figure is a view, partly in side elevation and partly in section, of so much of a printing press as is necessary to show the preferred embodiment of my invention.

Similar numerals of reference designate corresponding parts in the drawing.

The press shown comprises a conventional or any other suitable plate or disk 1, and form rollers 2, designed to be operated backwardly and forwardly on the plate 1 in the ordinary manner; said rollers 2 being composition rollers.

Adjustably connected to the press frame 3 at the point 4 is the frame 5 of the fountain or inking apparatus; the said frame carrying a fountain 6, fountain roller 7, of metal, equipped with a ratchet wheel 9 that is fast thereto, spring plate 10 and adjusting screws 11, and a lever 12 loosely mounted on one journal of the roller 7. The lever 12 is connected to a rod 13, through which and the lever and a pawl 14 on the lever, the roller 7 is rotated step by step from a working part of the press, preferably, though not necessarily, in the manner set forth in my Patent Number 401,542, of April 16, 1889.

In furtherance of my present invention I provide arms 15 connected to lugs 16 on the fountain frame, and in said arms I mount a composition roller 17 which contacts, preferably as shown, with the fountain roller. This roller 17 may be and preferably is an ordinary composition roller such as are always at hand in printing shops.

Pivoted to uprights 18 on the fountain frame are swinging arms 19, and in said arms is mounted a metallic roller 20 which is preferably smaller in diameter than the roller 17 in about the proportion illustrated, and is designed to normally contact with the same.

Incidental to the operation of the press, the fountain roller is turned step by step, and a thin film of ink is supplied thereto by the spring plate or blade in the fountain. This film of ink is transferred to the roller 17, and by said roller 17 is supplied to the metallic roller 20. The fountain roller, metallic roller, and intermediate composition roller being of different diameters, assure thorough distribution of the ink. On the upward traverse of the form rollers, the upper of said rollers contacts with and moves the metallic roller backwardly to an extent corresponding to one full revolution of the form roller, which assures the placing of a thin evenly-distributed film of ink upon the form roller. The said film of ink is further "broken up" by the contact of the form roller with the plate, with the result that when the ink is transferred to the form it is as fully distributed as would be possible on a cylinder press.

In the preferred embodiment of my invention, the fountain roller, the composition roller 17 and the metallic roller 20 are disposed above the upper half of the ink plate of the press as illustrated.

Having described my invention, what I claim and desire to secure by Letters Patent, is:

1. In inking means, the combination of an ink plate; a form roller movable thereover; an ink fountain supported above and spaced from the plate and having a metallic roller and means for rotating said roller; a composition roller permanently contacting with the forward lower portion of said metallic roller; a swinging support; and a metallic roller carried in the swinging support and normally contacting with the rear lower portion of the composition roller and movable backwardly by the form roller and arranged to remain in contact with and be rotated by said form roller until the latter passes forwardly under the composition roller that is in permanent contact with the first named metallic roller.

2. In inking means, the combination of an ink plate; a form roller movable thereover; an ink fountain supported above and spaced from said plate and having a roller and means for rotating said roller; a second roller supported in contact with the forward lower portion of said fountain roller; a swinging support; a third roller carried in said support and normally retained in contact with said second roller, said third roller being movable backwardly from such normal position by said form roller and arranged to remain in contact therewith and be rotated thereby until the same passes forwardly under said second roller.

3. In inking means, the combination of an ink plate; a form roller movable thereover; an ink fountain supported above and spaced from said plate and having a roller and means for rotating said roller; a second roller supported in contact with the forward lower portion of said fountain roller; and a third, swingably supported roller normally contacting with said second roller, said third roller being movable backwardly by said form roller and arranged to remain in rotary contact therewith until the same passes forwardly under said second roller.

4. In inking means, the combination of an ink plate; a form roller movable thereover; an ink fountain supported above and spaced from said plate and having a roller and means for rotating said roller; a second roller supported in contact with the forward lower portion of said fountain roller; a support movable back and forth in the general direction of travel of said form roller; and a third roller carried in said support and normally contacting with said second roller, said third roller being movable backwardly by said form roller and arranged to remain in contact therewith and be rotated thereby until the same passes forwardly under said second roller.

Signed by me, this 23rd day of April, 1915.

ALTON B. CARTY.

Attested by—
W. SETORKENS,
G. W. McCOMAS.

Copies of this patent may be obtained for five cents each, by addressing the "Commissioner of Patents, Washington, D. C."